P. W. PETERSEN.
RACK FOR COMESTIBLES.
APPLICATION FILED MAY 4, 1921.
1,388,297. Patented Aug. 23, 1921.
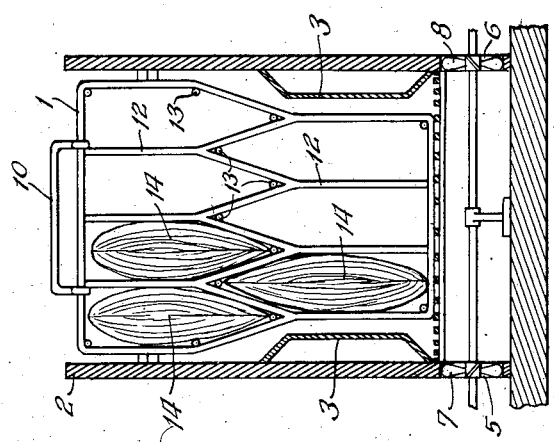
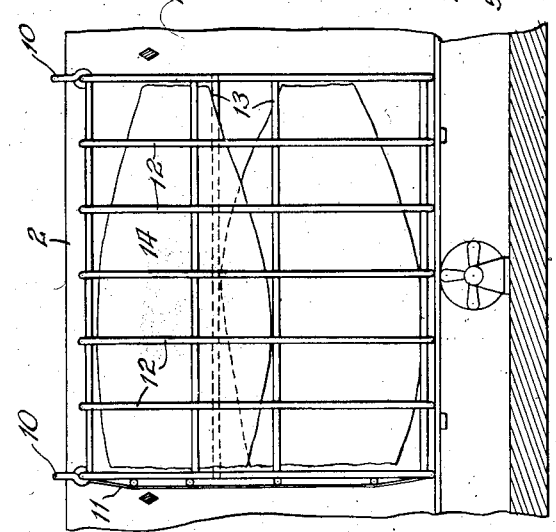
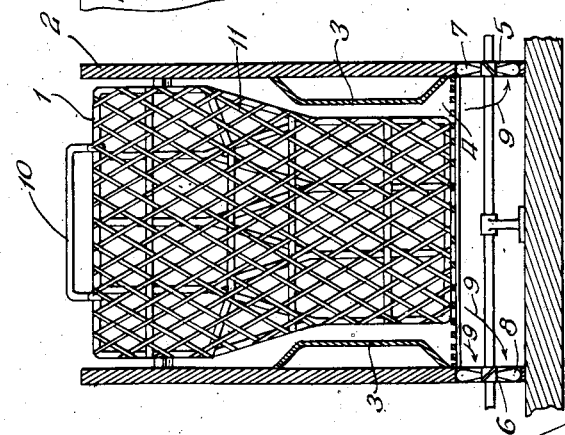

UNITED STATES PATENT OFFICE.

PAUL W. PETERSEN, OF CHICAGO, ILLINOIS.

RACK FOR COMESTIBLES.

1,388,297.　　　　Specification of Letters Patent.　　Patented Aug. 23, 1921.

Application filed May 4, 1921. Serial No. 466,632.

*To all whom it may concern:*

Be it known that I, PAUL W. PETERSEN, a citizen of the United States, residing at Chicago, in the county of Cook and State of Illinois, have invented new and useful Improvements in Racks for Comestibles, of which the following is a full, clear, concise, and exact description, reference being had to the accompanying drawing, forming a part of this specification.

My invention relates to holders or racks for supporting comestibles and it has special reference to racks for holding fish of large size, such as halibut and the like. The rack of my present invention is adapted to protect the fish from mechanical blows or injuries during the handling thereof and, at the same time, to facilitate in simultaneously treating large quantities of fish in a refrigerating apparatus which requires the fish to be immersed in a refrigerating solution that is in direct contact with the fish.

My present invention is designed to be used in connection with the refrigerating apparatus disclosed in my co-pending patent application, Serial No. 460,970, filed April 13, 1921, and entitled Refrigerating apparatus. In the refrigerating apparatus disclosed therein, the comestibles or fish which are to be treated are placed in racks which subsequently are immersed in a refrigerating solution that is circulated, preferably through mechanical means in the refrigerating tank. The fish, when disposed in a rack of my present invention, may be thus treated in very large quantities and are capable of being immersed in a refrigerating solution and withdrawn therefrom without being removed from the rack. The object, therefore, of my present invention is to provide a rack of the above indicated character which will permit economical refrigerating of large fish in large quantities in refrigerating apparatus of the general character disclosed in the above identified patent application.

For a better understanding of the nature, scope and characteristic features of my invention reference may be had to the following description and the accompanying drawing, in which:

Figure 1 is an end view showing a rack embodying a form of my invention in position in the refrigerating compartment of a refrigerating apparatus.

Fig. 2 is an elevational side view of the structure shown in Fig. 1; and

Fig. 3 is a view taken from the open end of the rack illustrated in Fig. 1.

Referring to the drawings, the rack 1 which comprises an open-work structure is contained within a compartment 2 which may be one of several compartments comprised in the refrigerating apparatus. Expanded portions 3 are provided at the lower portion of the compartment 2 in order that the refrigerating solution may be given an accelerated movement when circulated downwardly through the compartment, a false bottom 4 and out through openings 5 and 6. The propellers 7 and 8 disposed respectively in the openings 5 and 6 impart to the refrigerating solution a forced circulation, the direction of which, is indicated by the arrows 9. The refrigerating compartment 2 and its associated apparatus, excepting the rack 1, forms no part of my present invention but is fully described and disclosed in my co-pending patent application hereinbefore referred to.

The rack 1 is provided at each of its ends with lifting handles 10 which permit the withdrawal of the rack from the compartment 2. The closed end of the rack, which is shown in Fig. 1, is provided with a lattice work closure 11 which prevents the fish or comestibles contained within the compartments comprised in the rack from falling out of the rack. The rack 1 is formed of a plurality of spaced open work partitions 12 that are held in position by means of being secured to a plurality of longitudinal extending members 13. The partitions 12 are correspondingly perforated in order to form compartments or pigeon holes, as it were, for inserting the several fish 14.

In the structure illustrated there are shown four such pigeon holes or compartments in the upper tier of the rack and three compartments in the lower tier, the three of the lower tier being sandwiched between the adjacent and superposed compartments of the upper tier. The fish 14 are positioned in the several compartments, those of the upper tier having their backs placed upwardly and those in the lower tier having their backs placed downwardly. By this arrangement of the fish, minimum cross sectional space is required in the compartment 2 for accommodating the maximum number of fish. The fish may be placed into the rack pigeon holes from the right hand end as viewed in Fig. 2, and are held from falling out through the other end by the lattice-work member 11, heretofore described.

The longitudinally extending members 13 may be secured in any suitable manner, preferably by welding, to the partitions 12 and serve to brace the partitions 12 against collapse when the rack is loaded and suspended from the handles 10. The members 13 also retain the partitions 12 permanently spaced from one another. It will be observed from the foregoing description of my invention that the rack will be very rigid and, at the same time, be of such open work construction that the comestibles 14 held in the rack are capable of being placed in direct contact with the refrigerating solution. Substantially all of the surface of the comestibles is thus under the direct influence of the refrigerating solution.

While I have shown and described one embodiment of my invention it is to be understood that other modifications may be made therein without departing from the spirit and scope of the appended claims.

Having thus described my invention what I now claim as new and desire to secure by Letters Patent, is:

1. A rack for comestibles adapted to be immersed in a refrigerant and comprising an open-work frame to permit the comestibles held in said rack to come in direct contact with the refrigerant, a plurality of side-by-side partitions supported in said frame, said partitions being perforated to form a plurality of transverse and superposed rows of pigeon holes that are severally adapted to support comestibles longitudinally of their length, the pigeon holes in one row being staggered with respect to those in the adjacent row.

2. A rack for comestibles adapted to be immersed in a refrigerant and comprising an open-work frame to permit the comestibles held in said rack to come in direct contact with the refrigerant, and a plurality of side-by-side partitions supported in said frame and correspondingly perforated to form a plurality of zig-zag pigeon holes whereby comestibles longitudinally disposed in said pigeon holes may be mechanically supported in the rack at a plurality of points, said pigeon holes being disposed in superposed tiers and those in one tier being sandwiched, for a portion of their length, between those in an adjacent tier.

3. A rack for comestibles adapted to be immersed in a refrigerant and comprising an open-work frame to permit the comestibles held in said rack to come in direct contact with the refrigerant, a plurality of side-by-side partitions supported in said frame, said partitions being perforated to form a plurality of transverse and superposed rows of pigeon holes that are severally adapted to support comestibles longitudinally of their length, said pigeon holes being acute-angled at one side and said rack being so formed that said angled portions are sandwiched between each other whereby a maximum number of comestibles having substantially the same cross-section as said pigeon holes may be disposed in said rack.

4. A rack for comestibles adapted to be immersed in a refrigerant and comprising an open-work frame to permit the comestibles held in said rack to come in direct contact with the refrigerant, and a plurality of side-by-side partitions supported in said frame and correspondingly perforated to form a plurality of zig-zag pigeon holes whereby comestibles longitudinally disposed in said pigeon holes may be mechanically supported in the rack at a plurality of points, said pigeon holes being disposed in superposed tiers and those in one tier being sandwiched, for a portion of their length, between those in an adjacent tier, and there being one less pigeon hole in the lower tier than in the upper whereby said frame is reduced in transverse dimension at the bottom thereof.

In witness whereof, I have hereunto subscribed my name.

PAUL W. PETERSEN.

Witnesses:
 GEO. W. HANSEN,
 MABEL ZENDER.